May 19, 1931.                A. STUCKI                1,806,003
ROLLER SIDE BEARING

Filed Jan. 5, 1929

INVENTOR
Arnold Stucki
BY
Brown & Critchlow
ATTORNEYS

Patented May 19, 1931

1,806,003

UNITED STATES PATENT OFFICE

ARNOLD STUCKI, OF PITTSBURGH, PENNSYLVANIA

ROLLER SIDE BEARING

Application filed January 5, 1929. Serial No. 330,473.

This invention relates to bearings for railway cars.

In a prior Patent No. 1,427,174, issued August 29, 1922, I have illustrated and described a roller side bearing for the lower bolsters of railway cars which comprises a housing having a pair of rollers freely mounted therein. In this bearing two rollers are used instead of one to increase the contact area between the bearing surfaces, and the roller-engaging surface in the housing is so formed that the pounding action between the upper and lower bearings is prevented from producing rough spots on the circumference of the rollers and on the bearing surfaces.

The present invention is an improvement upon that type of bearing, and has for its object the provision of a double roller side bearing which embodies all the advantages of both the single and double roller type of side bearings without having the disadvantages of either.

More especially it is an object to provide a simply constructed, durable, inexpensive double roller side bearing in which there is prevented not only the liability of the rollers developing flat spots or recesses, or the bearing surface upon which they travel becoming rough or recessed, thus interfering with their free travel, but in which there is also prevented the frictional engagement of the rollers with each other as well as any jamming action between the two when the upper bolster is lifted.

Figure 2:
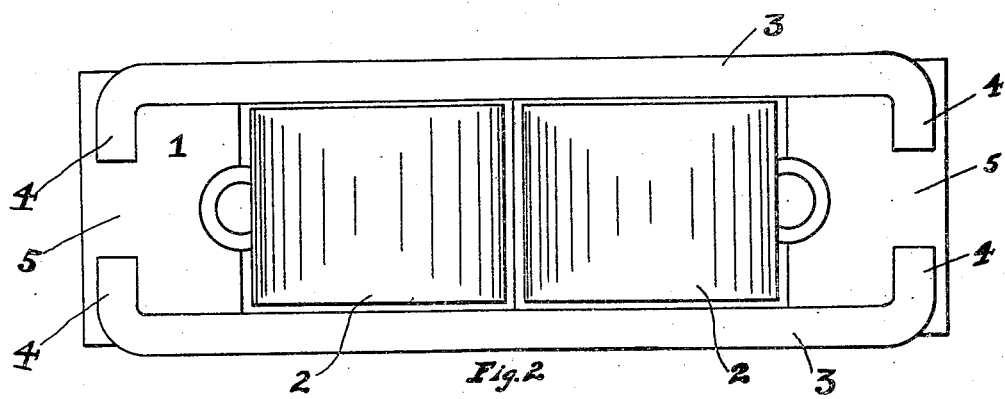
Figure 1:
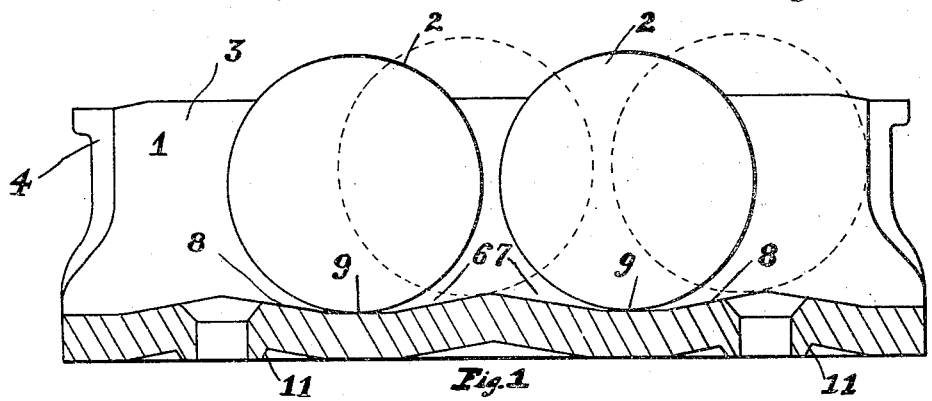
Figure 3:
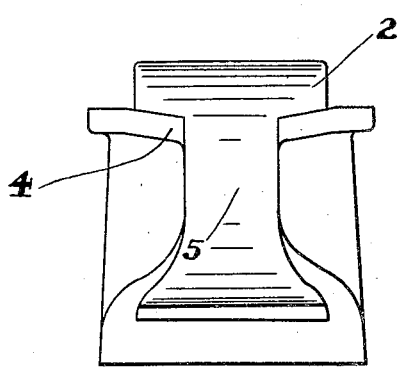

These and other objects will become apparent, and a better understanding of the invention will be had when the following detailed description is read in conjunction with the accompanying drawings, in which Fig. 1 is a vertical section taken longitudinally through the center of the preferred embodiment of the invention; Fig. 2 is a plan view of the bearing; Fig. 3 an end elevation of the same; and Fig. 4 a vertical section through the housing bearing surface showing the integral supporting bosses underneath the inclines at the outer ends of the two pockets.

As illustrated in the drawings, the bearing comprises a suitable frame or housing 1 having a pair of rollers 2 arranged therein. These rollers are each of liberal diameter and length to afford sufficient resistance against the pounding action of the body bolster, which is considerable because the clearance between the upper and lower parts of the side bearing is often quite large. The large diameter of the rollers not only provides more area of contact between the bearing surfaces, but also greatly reduces the rolling friction of the bearing.

To confine the rollers and prevent them from jumping out under normal operating conditions, the housing is provided with upwardly projecting side and end walls or barriers 3 and 4, respectively, which extend upwardly materially above the center of the rollers, thus forming a cage deep enough to prevent the rollers from escaping. These side walls are spaced such a distance apart that the rollers fit between them quite closely, and the rollers are of considerable diameter, so that notwithstanding that they are entirely free, they are not liable to become askew, and no binding of the rollers which may prevent them from returning to their central or normal positions is likely to occur. The end walls 4 are shaped to form stops for the rollers, preferably being so formed that their upper portions engage the rollers, as indicated in Fig. 1. To prevent dirt from collecting in the housing, the end walls are provided with openings 5 which extend downwardly to the bearing surface permitting dirt to freely pass out of the housing.

In order that there will be no frictional engagement between the rollers in service, and so that they will be prevented from jamming against each other when the upper bolster is lifted, separate pocket-like bearing surfaces 6 and 7 are provided in the bottom of the housing, one for each of the rollers. These bearing surfaces preferably comprise the bottom of the housing itself as indicated. The end portions 8 of each of the pockets are inclined or curved upwardly as shown, so that after the rollers ride upon them gravity will cause the rollers to roll back toward the central portion of the pocket when the upper bolster lifts. Hence, normally, that is, when the upper bolster is not in contact with the rollers, both rest in the central portion of the pockets.

A short portion 9 in the center of each of pockets 6 and 7 is made level so that when the rollers return thereto they will not always come to rest at exactly the same point. Consequently the blows from the upper bolster are not always applied to the same point of the bottom bearing surfaces, and the liability of these surfaces becoming grooved or recessed is greatly reduced as compared with side bearings in which the rollers always come to rest at the same positions.

Figure 4:
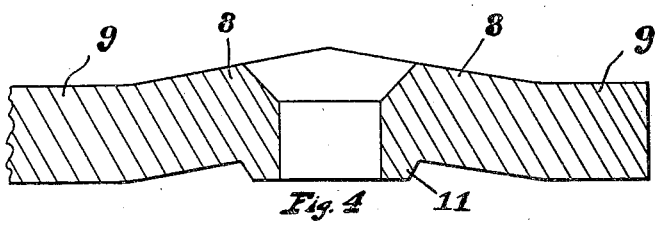

While the bearing housing may be made either by casting, or forging, the latter method of formation is preferable because in this way a housing of increased strength is provided. Obviously, if the housing is cast the inclined portions of the bearing surfaces of the roller-receiving pockets may be adequately supported by thickening the bearing. However, if as generally disclosed in Patent No. 1,499,126 to A. B. Severn, the housing is forged or pressed from a rolled channel section having a web of substantially uniform thickness, it is desirable to provide supports for the outer inclined end portions. As indicated in Figs. 1 and 4 of the drawings, this may be done by forging a boss 11 on the underside of the outer inclined end portion of each of the bearing surface pockets. For convenience in attaching the bearing housing to the upper face of a bolster, rivet holes 11 may be punched in the bearing surface at the points where the two bosses are located, and preferably this is in the longitudinal center of the bearing surface. The bottom of the housing is made to conform in general to the upper face of the lower bolster so that the housing may be readily attached thereto by means of rivets positioned in the openings extending through bosses 11.

In use, when the car body is not swaying, the upper bolster slightly clears the rollers, and consequently both rollers lie on the level or central portions of pockets 6 and 7, as shown in full lines in Fig. 1. Should the top bolster rest upon these rollers when the car is on a curve, both rollers move in the direction in which the swiveling of the truck tends to rotate them, and normally both maintain substantially the same positions with respect to the upper and lower bearing surfaces, as indicated in dotted lines. As soon as the body bolster lifts, the rollers are both released and roll by gravity back to the flat portions in the bottoms of the pockets, and both remain in substantially the position shown in Fig. 1. The return of the rollers to the central positions occurs immediately upon the lifting of the body bolster, and consequently when the body bolster again comes down, its pounding action is resisted by both rollers. Furthermore, the rollers do not jam against each other when the upper bolster lifts nor do they frictionally engage each other as they are being rolled from one to another position.

The bearing is of simple, durable, and compact construction, inexpensive both as to first cost and upkeep, and is formed of a minimum number of parts. Furthermore dirt is permitted to freely pass out of the housing. The large size of the rollers and the separate bearing pockets make the bearing nearly frictionless, and prevents jamming together of the rollers. Both rollers are free to travel in the housing under all changes of angular relations between the top and bottom bolsters, and roll back to the central position of the pockets immediately upon the separation of the bolsters.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. A side bearing for lower bolsters of railway cars comprising a forged cage formed of a rolled channel section, the bottom of which is of substantially uniform thickness and adapted to provide a bearing surface transverse to the bolster, said bottom being pressed upwardly at spaced points between its ends to form two separate roller receiving pockets each of which is inclined upwardly at its ends, and bosses formed on the under side of the bearing surface at the outer ends of said pockets for supporting the inclined portions thereof.

2. A side bearing for lower bolsters of railway cars comprising a forged cage formed of a rolled channel section, the bottom of which is of substantially uniform thickness and adapted to provide a bearing surface transverse to the bolster, said bottom being pressed upwardly at spaced points between its ends to form two separate roller receiving pockets each of which is inclined upwardly at its ends and has a centrally located flat portion intermediate thereof, bosses formed on the under side of the bearing surface at the outer ends of said pockets for supporting the inclined portions thereof, and a free roller arranged in each of said pockets and side walls of the channel forming the cage being extended upwardly beyond the centers of the rollers, and the upper extremities of said walls being bent inwardly to form limiting abutments for the rollers.

3. A side bearing for lower bolsters of railway cars comprising a cage formed of a rolled channel section the bottom of which is of substantially uniform thickness and adapted to provide a bearing surface arranged to extend transverse to the bolster, said bottom being pressed upwardly at spaced points between its ends to form two separate roller receiving pockets each of which is inclined upwardly at its ends and has a bolt receiving opening formed in the outer end thereof for anchoring the cage to the bolster, the metal displaced by the openings being pressed downwardly to form bosses on the under side of the bearing surface for supporting the outer end portions of the pockets.

In testimony whereof, I sign my name.

ARNOLD STUCKI.